(12) United States Patent
Roach et al.

(10) Patent No.: US 8,473,478 B2
(45) Date of Patent: Jun. 25, 2013

(54) AUTOMATIC REAL-TIME FILE MANAGEMENT METHOD AND APPARATUS

(76) Inventors: Warren Roach, Colorado Springs, CO (US); Steven R. Williams, Colorado Springs, CO (US); Troy J. Reiber, Colorado Springs, CO (US); Steven C. Burdine, Middleton, WI (US)

(*) Notice: Subject to any disclaimer, the term of this patent is extended or adjusted under 35 U.S.C. 154(b) by 1836 days.

(21) Appl. No.: 09/957,459

(22) Filed: Sep. 21, 2001

(65) Prior Publication Data

US 2002/0065837 A1    May 30, 2002

Related U.S. Application Data

(60) Provisional application No. 60/234,221, filed on Sep. 21, 2000.

(51) Int. Cl.
  *G06F 17/30*    (2006.01)
(52) U.S. Cl.
  USPC .......................................................... 707/707
(58) Field of Classification Search
  USPC ................. 707/203, 204, 200, 201, 102, 202
  See application file for complete search history.

(56) References Cited

U.S. PATENT DOCUMENTS

| | | | |
|---|---|---|---|
| 5,276,867 A | 1/1994 | Kenley et al. | 395/600 |
| 5,638,059 A * | 6/1997 | Pilkington | 340/970 |
| 5,668,991 A | 9/1997 | Dunn et al. | 395/618 |
| 5,751,997 A | 5/1998 | Kullcik et al. | 395/489 |
| 5,765,173 A | 6/1998 | Cane et al. | 707/204 |
| 5,978,815 A | 11/1999 | Cabrera et al. | 707/204 |
| 6,023,710 A | 2/2000 | Steiner et al. | 707/204 |
| 6,047,294 A | 4/2000 | Deshayes et al. | 707/204 |
| 6,101,507 A | 8/2000 | Cane et al. | 707/204 |
| 6,460,055 B1 * | 10/2002 | Midgley et al. | 707/204 |
| 6,535,894 B1 * | 3/2003 | Schmidt et al. | 707/204 |
| 6,629,109 B1 * | 9/2003 | Koshisaka | 707/203 |
| 7,117,371 B1 * | 10/2006 | Parthasarathy et al. | 713/187 |

* cited by examiner

*Primary Examiner* — Baoquoc N To
(74) *Attorney, Agent, or Firm* — Cahn & Samuels, LLP (57) ABSTRACT

A method for archiving files includes determining when a change in an operating file is imminent, capturing the operating file immediately before the change in the operating file occurs, if the operating file has not already been captured; and capturing the operating file immediately after the change in the operating file has occurred.

11 Claims, 6 Drawing Sheets

AUTOMATIC REAL-TIME FILE MANAGEMENT METHOD AND APPARATUS

This application claims the benefit of Provisional Application No. 60/234,221 filed Sep. 21, 2000, which is herein incorporated by reference.

FIELD OF THE INVENTION

This invention relates to file preservation, file capture, file management and file integrity techniques for computing devices.

BACKGROUND OF THE INVENTION

One of the greatest challenges faced by information technology (IT) professionals and computer users today, particularly in the business environment is the protection and management of data. Data may be stored on user workstations, e.g., laptop computers, home or office desktop computers, network servers or other devices external to the workstations. Important data may even be stored on hand-held computing devices such as PDAs, PALs and other like devices. Complicating the problem is the fact that the criticality of data is increasing and the difficulty of managing it, protecting it from loss and keeping it available is increasing. This is due to a variety of factors, including: 1) the explosion in data volume, particularly that stored on desktop and laptop computers, 2) the increasing complexity of desktop and laptop computer software and hardware and increasing trends toward a paperless environment were absolute reliance (because paper copies are becoming less the norm) on data integrity is increasingly significant.

Many home computer users do not realize the vulnerability of their computer data. Many that do understand the very real potential for data loss, purchase backup systems whose operation and user interface is often confusing and/or time-consuming to use, dramatically decreasing their effectiveness or dependability. As a result, many computer users remain very much at risk of data loss resulting from hardware and/or software failures, fires, stolen equipment, etc. While these risks are significant, the most frequent cause of data loss is user error (accidental file deletes, file overwrites, errant programs, etc.), to which users remain very vulnerable even with most present day backup systems.

The financial impact of information loss is substantial. As reported by the Safeware Insurance Agency, in 1999 alone, insurance claims for damaged, lost and stolen computers (primarily notebook computers) totaled more than $1.9 billion. This figure does not include the untold billions lost in intellectual capital and time. It is costly to recreate lost data and there are significant related costs such as lost productivity and lost opportunity. Consider, for example, the financial and health related impact of a doctor losing all patient contact information and medical histories due to a hard disk crash or some other type of computer failure. In addition, it is costly to keep desktop and laptop computers up and running in the wake of their increasing complexity.

A variety of products have been developed to address data preservation and integrity issues. These products may be loosely grouped into three categories, manual backup systems, schedule based backup systems and mirroring backup systems.

The least efficient and probably one of the most frequently used backup systems is the manual backup. At times determined by the user, the user selects files to be backed up and either utilizes the built in backup procedure for the corresponding application or manually copies the selected files to a desired backup storage media.

The problems with this method of preserving data are self-evident. Backup procedures are often confusing and may differ from application to application. Accordingly, the user must familiarize itself with the various methods for performing backups. In addition, users may forget to backup or elect not to on a given occasion due to time constraints or other reasons. Manual backups often do not allow the user to continue to use the system during the backup procedure. Furthermore, data stored to the backup media is really only a "snapshot" of the data at the time that the backup is performed. Any changes made between manual backups would be lost if there was a failure on the computer's storage device.

Schedule based backup systems typically perform backups according to a schedule either set by the user or preset by the backup software. One of the major disadvantages of each type of schedule-based backup system is that as with manual backups, they miss work done between schedule points. This may cause the user to loose critical information as they work between schedule points. Another disadvantage of schedule-based backups systems is that they are frequently confusing and cumbersome for the user. Still another disadvantage of schedule-based backup systems is that they function poorly if at all when the backup storage device is unavailable, i.e., they cannot be written to due to a communications error or because the device has reached its capacity, is bandwidth limited, or is non-operational for some other reason.

Mirroring is a technique typically applied to disk based backup systems. Mirroring backup systems are the most comprehensive in that everything that happens to the source storage device immediately happens to the backup storage device. That is the backup drive becomes a mirror image of the source drive. Accordingly, if a failure occurs on the source disk, processing can be switched to the backup disk with little or no service interruption.

The strongest advantage of mirroring systems is also their strongest disadvantage. Because there is no operational discrimination, if a file is accidentally deleted from the source disk, it is deleted and cannot be preserved on the backup disk. Likewise, if a virus infects the source disk it is likely to infect the backup disk. Another disadvantage of mirroring systems is that separate backup disks are required for each source disk, doubling the disk requirement for the system. The backup disk must be at least as large as the source disk and the disks must be configured with identical volume mapping. Any extra space that may be present on the backup disk is unavailable.

All of these methods require that the user specify which files/directories to back up, but many users have no concept of files and directories in their thought process, much less are they able to correlate a particular application (e.g. Microsoft Excel) with the kinds and locations of files they generate. These systems simply require too much user knowledge, and too much user intervention. The backup user's risk increases dramatically the lower his computer knowledge may be.

In view of the foregoing, there is a need for a file capture, preservation and management system that captures files just before and/or just after they have been changed to minimize loss of data between backup events. There is also a need for file capture and preservation system that captures files even when the destination storage medium for the files is unavailable. There is a further need for a system that allows users to recover easily and quickly from any type of information loss, including simple user errors, failed software installations or updates, hardware failures (attached storage devices), and lost or stolen laptop computers. Users should be able to recover on their own, without the intervention of the IT staff, and their backup systems should be as "behind the scenes" as possible, requiring little user attention and extremely small amounts of user computer knowledge.

SUMMARY OF THE INVENTION

It is an object of the invention to a file capture, preservation and management method and apparatus that captures files just before and/or just after the files are changed.

It is another object of the invention to provide a file capture, preservation and management method and apparatus that has an imperceptible impact on system performance from the user's point of view.

It is a further object of the invention to provide a file capture, preservation and management method and apparatus that captures and stores files even when there is no connection to the desired storage location.

Still another object of the invention is to provide a file capture, preservation and management method and apparatus that captures and stores files even when the desired storage location is unavailable.

In accordance with an aspect of the invention, a method for archiving files is provided. The method includes, in a computing device, detecting an instruction from a resident program to perform an operation on an operating file. Upon detection of the instruction, capturing the operating file temporally proximate to the operation being performed on the operating file.

In accordance with another aspect of the invention, a method for moving files from a first storage location to a second storage location is provided. The method includes, in a computing device, searching a first storage location for files responsive to the occurrence of a first event and moving the files from the first storage location to the second storage location responsive to a second event.

In accordance with still another aspect of the invention, a method for archiving files is provided. The method includes detecting an instruction from a resident program to perform an operation on an operating file. The method further includes creating an archive file from the operating file and storing the archive file in a first storage location temporally proximate to the operation being performed on the operating file and responsive to detecting the instruction. In keeping with the method, the first storage location is searched for an archive file responsive to the occurrence of a first event. The archive file is then moved from the first storage location to the second storage location responsive to a second event.

The accompanying figures show illustrative embodiments of the invention from which these and other of the objectives, novel features and advantages will be readily apparent.

DETAILED DESCRIPTION OF THE EMBODIMENT

Definitions

Operating System (OS)—A computer program that allocates system resources such as memory, disk space, and processor usage and makes it possible for the computer to boot up to a human user interface allowing the user to interact with the computer and control its operation.

Operating File—a system or user file.

Archive File—a file containing all of the data of an operating file in a native or altered format and/or a file containing at least some of the data of an operating file and including references to the location of the remainder of the data of the operating file.

Computing Device—a personal computer, a laptop or notebook computer, a server, a hand-held computing device, a PDA or a PAL. The term computing device is not specific to the kind of operating system being run on such computing device, and includes devices running Microsoft operating systems, Apple Macintosh operating systems, UNIX operating systems, Linux operating systems, and other operating systems.

Storage Location—any storage device, or a buffer, folder, directory or designated area on a storage device.

Personal Attached Storage Device—any internal or external storage device connected to a computing device.

Network Attached Storage Device—any storage device connected directly to a network to which a first computing device is also temporarily or permanently connected, or any storage device connected to a second computing device that is also temporarily or permanently connected to the network to which the first computing device is temporarily or permanently connected.

Internet storage area network—any storage area (device, collection of devices, etc.) that can be accessed by the computing device when the computing device is temporarily or permanently connected to the Internet.

Peer-to-Peer Storage Device—any storage area (device, collection of devices, etc.) that can be accessed by the computing device when it is sharing resources with other network or Internet accessible computers.

Resident Program—an operating system (OS) or other program that has control over file operations such as "read", "write", "save", "rename", "delete", "copy", "move", "open", "close", etc.

User Program—an application software program or other computing program installed by the user or by the computer manufacturer for user creation of desired data, documents, or other information that is designed to enhance the functionality and/or enjoyment and/or usability of the computing device. The present invention is directed to an apparatus and/or method for file capture, preservation and management. The invention includes a file capture aspect and smart data management aspect. The invention may be realized as a method and/or an apparatus. More particularly, the invention may be realized as a set of program code instructions stored on a computer usable medium, a set of program code instructions embodied in a signal for transmitting computer information, and a processor and/or computing device configured as described herein.

Figure 1:
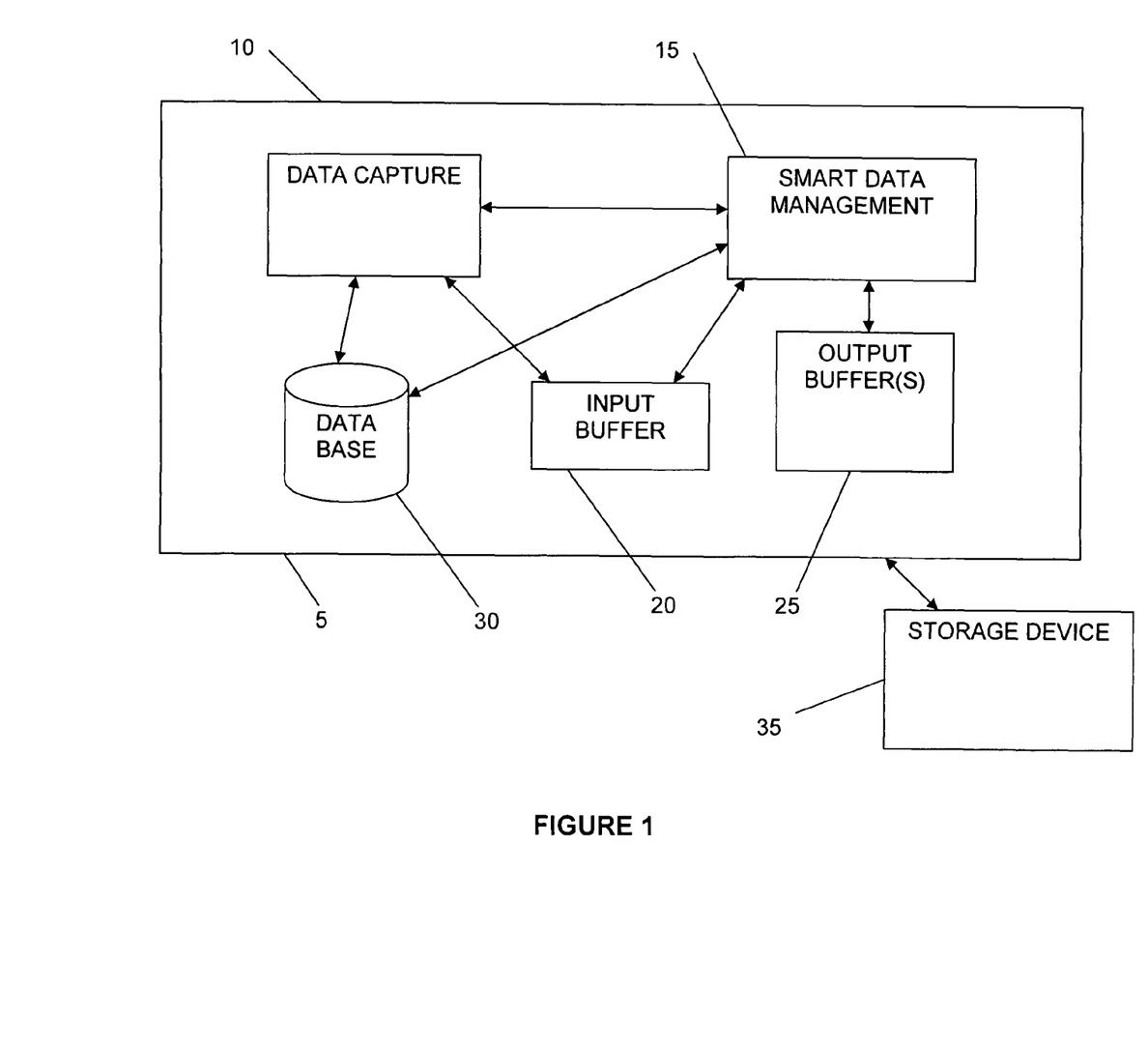
FIG. 1 illustrates a block diagram of a computing device in accordance with the present invention.

FIG. 1 depicts a block diagram in accordance with the present invention comprising a computing device 5 including a file capture block 10 (or file capturer), a smart data management block 15 (or smart data manager), an input buffer 20, output buffer(s) 25, and a database 30. A storage device 35 is also provided and may be either internal or external to computing device 5. The invention functions in conjunction with a resident program on computing device 5.

In accordance with an embodiment of the invention, file capture block 10 detects an instruction to perform an operation on an operating file initiated by the resident program of computing device 5. At a moment temporally proximate to when the resident program actually performs the operation, i.e., just before and/or just after the operation is performed on the operating file, or, more preferably, the instant before and/or the instant after the operating file is changed, file capture block 10 captures the operating file or portions thereof. Preferably, the operating file is captured within a few clock cycles of the detection of the instruction.

In keeping with a preferred aspect of the invention, file capture block 10 causes the location of the captured operating file to be recorded in database 30. The continued process of recording information about captured operating files, or portions thereof, in database 30 creates a record of each version of the operating file, which may be accessed by the user or by other programs.

File capture is preferably executed by creating an archive file from the operating file. The archive file is preferably stored in a temporary storage location, internal or external to the computer, such as input buffer 20. However, the archive file may be stored directly in storage device 35. In accordance with a preferred aspect of the invention, storage device 35 may be a personal attached storage device, a network attached storage device, an Internet storage area network, a peer-to-peer storage device, or other storage device.

In keeping with a preferred aspect of the invention, smart data management block 15 manages the migration of the archive file from the input buffer 20 through the output buffers 25 to storage device 35. This migration may take place either synchronously or asynchronously with the file capture procedures described herein. The time duration from a file arriving in input buffer 20 and when it arrives on archive storage device 35 is managed by the smart data management block 15. More particularly smart data management block 15 regularly examines input buffer 20 for the presence of archive files. Smart data management block 15 performs this examination upon the occurrence of an event, e.g., messages from the file capture block 10 and/or various messages from the resident program(s), messages from an input buffer timer sent at time intervals controlled by a timer or at time intervals selected by the user. Optionally, smart data management block 15 may then examine database 30 to determine a defined storage location for each of the archive files stored in input buffer 20. Each archive file stored in the input buffer 20 may be directed to the same storage location or to different storage locations and archive files may be directed to multiple storage locations for redundancy. Preferably, smart data management block 15 moves the archive files to one or more output buffers 25. More preferably each archive file is moved to output buffer(s) 25 corresponding to the final storage location(s) for that archive file. Alternatively, all archive files may be moved to a single common output buffer 25 if desired. Upon the occurrence of an event, and/or at defined time intervals, smart data management block 15 moves the archive files from the output buffers 25 to their respective storage device(s) 35. Exemplary events include but are not limited to messages indicating when storage device 35 is connected and ready for use, messages indicating when storage device 35 is inserted/removed, full, defective, etc., and messages indicating when storage device 35 is disconnected or unavailable, and messages from a storage device timer sent at time intervals controlled by the timer or at time intervals controlled by the user. The input buffer timer and the storage device timer may operate synchronously or non-synchronously.

Under certain conditions, smart data management block 15 may be unable, or may elect not to move the archive files. For example, if storage device 35 is unavailable then smart data management block 15 will not move the archive files to storage device 35. Among the conditions that may cause storage device 35 to be unavailable are i) storage device 35 is disconnected from computing device 5, ii) the connection between storage device 35 and computing device 5 is faulty or unacceptably slow, iii) storage device 35 is full, or iv) storage device 35 is malfunctioning. In addition, smart data management block 15 may also regulate movement of archive files according to time schedules set by the user, by monitoring connection bandwidth availability and moving files only during times of high bandwidth availability, or by monitoring other factors including messages that may received from storage location server requests for archive file transmittal.

Figure 2A:
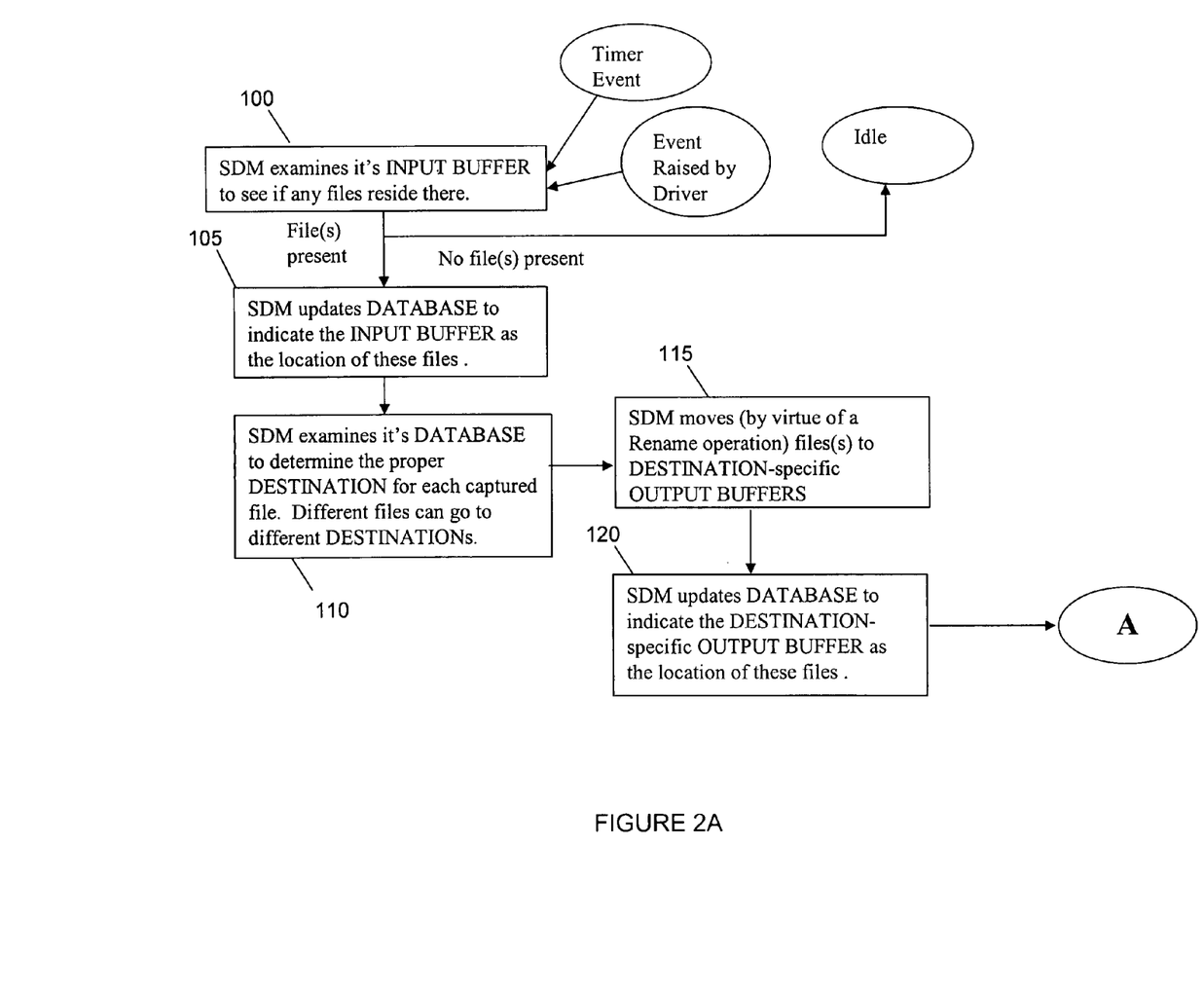
FIG. 2A is a flow chart depicting a process for moving files in accordance with the present invention.
Figure 2B:
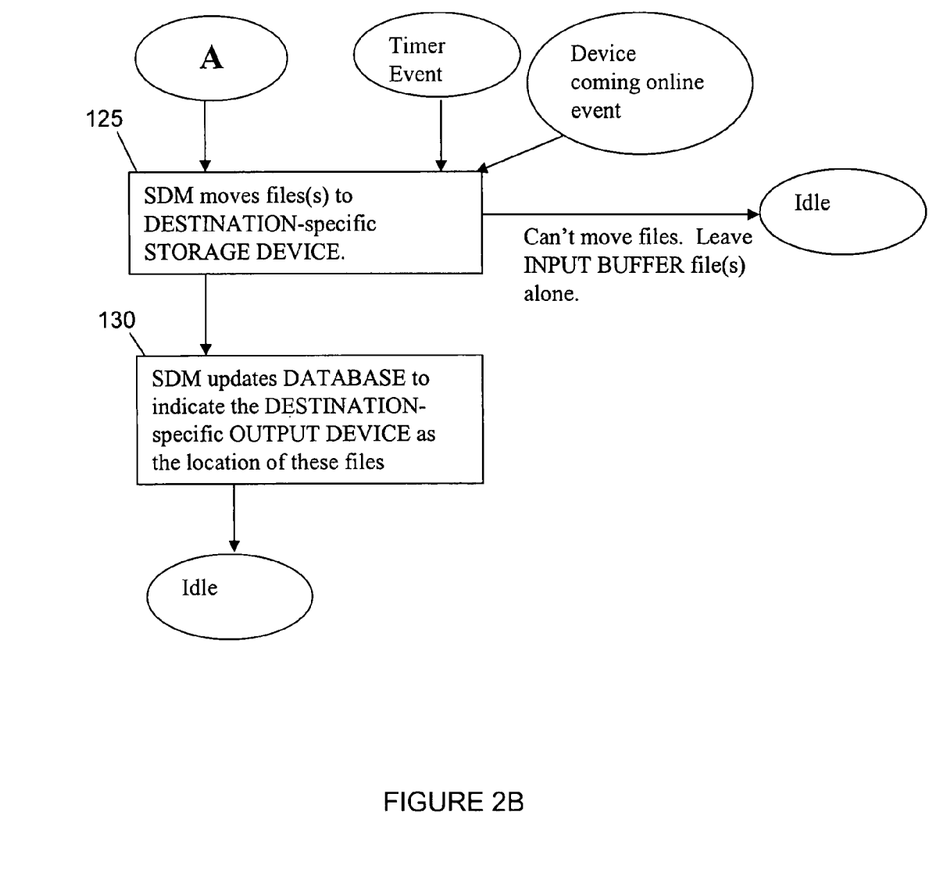
FIG. 2B is a flow chart showing another process for moving files in accordance with the invention.

A preferred operational mode for smart data management block 15 is illustrated in the flowcharts of FIGS. 2A and 2B. In step 100 of FIG. 2A, smart data manager 15 examines input buffer 20 to determine whether any archive files are stored therein. If no archive files are present, smart data manager 15 rests idle until the next event occurs. If archive files are detected, in step 105, smart data manager 15 updates database 25 to indicate the location of the archive files; that is, to indicate that the archive files are resident in input buffer 20. In step 110, smart data manager 15 examines database 30 to determine the proper destination for each archive file. In step 115, smart data manager 15 moves the archive files to output buffers 25. In step 120, smart data manager 15 updates database 30 to indicate that the archive files are now stored in the output buffer.

In FIG. 2B in step 125, the archive files are moved to one or more storage devices 30. If smart data manager 15 is unable to move the archive files to any of the storage devices 30, smart data manager 15 rests idle and does not move the archive files until it is notified that the storage device is available. Accordingly, the archive files remain in either input buffer 20 or output buffer 25 until smart data management block 15 is notified. In step 130 smart data manager 15 updates database 25 to indicate that the archive files are stored in one or more storage devices 30.

Use Specific to User Program Operations

The following examples are directed to embodiments of the invention specific to operations performed by a user program. The file capture, preservation and management processes of the invention are not limited to execution with the exemplary operation discussed below. The processes of the invention are preferably executed when a resident program causes a change or a change to be imminent in the operating file. Therefore, the following examples are intended to be exemplary only and nonlimiting.

File Capture at File Open

Figure 3:
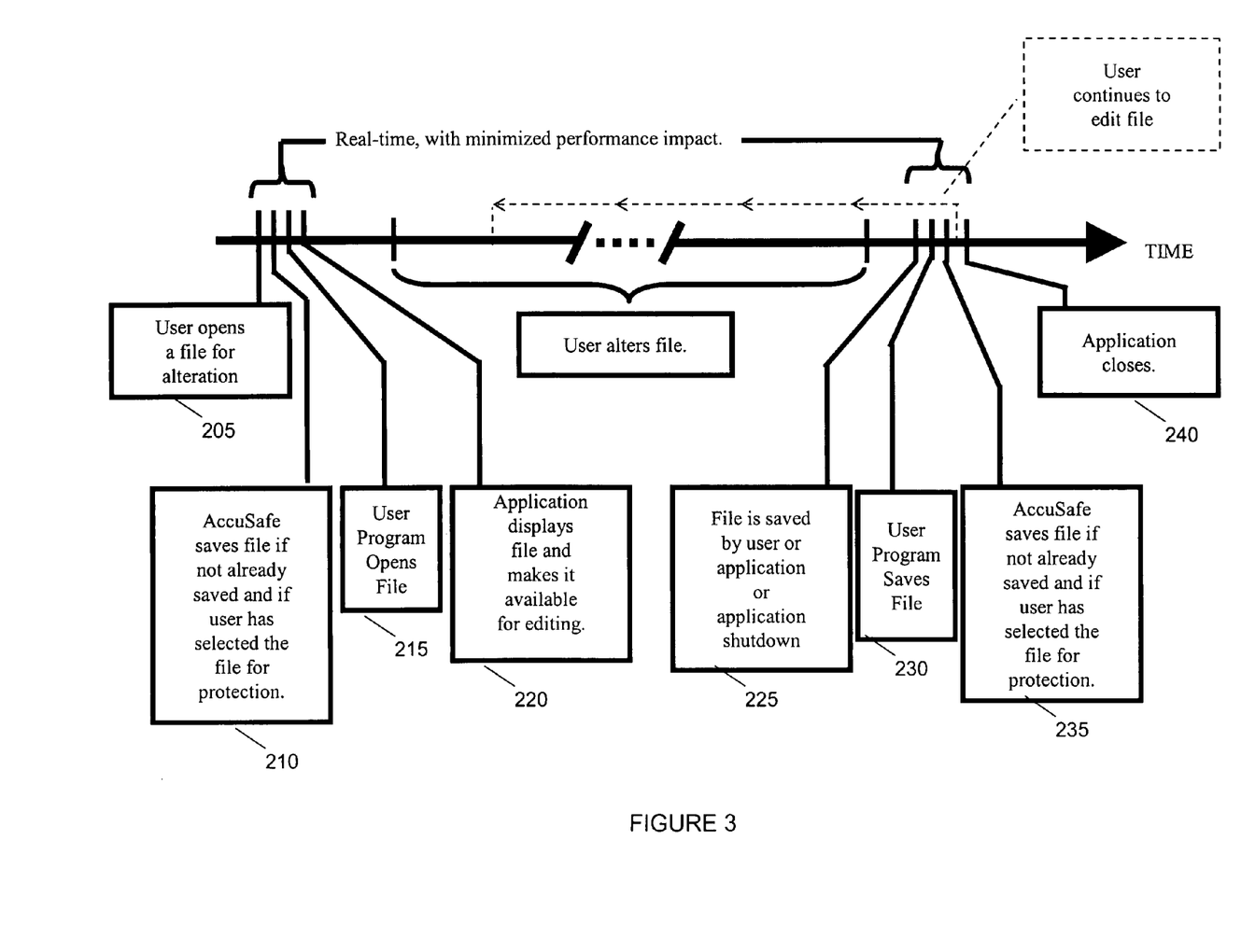
FIG. 3 is a time line illustrating a sequence of events in an exemplary operation in accordance with the invention.

As illustrated in FIG. 3, in step 205, the user or a program selects an "open" operation to open an operating file and an instruction to perform that "open" operation on the operating file is sent to the resident program. In step 210, file capture block 10 detects the instruction and captures the operating file. Optionally, prior to capturing the operating file, file capture block 10 may check database 30 to a) determine whether the operating file has previously been archived, b) determine whether the user has selected the operating file for protection, or c) determine a match to other defined conditions. If the go-ahead conditions exist, then file capture block 10 creates an archive file and stores the archive file in a storage location such as input buffer 20 or storage device 35 just before the resident program opens the operating file. Preferably, file capture block 10 stores the archive file in input buffer 20. In step 215 the resident program opens the operating file and in step 220 the user program displays the operating file as originally requested, e.g. Microsoft Word, and makes it available for the user to alter, e.g., edit a word processing document, amend or add to a database, etc. Step 210 is performed by momentarily delaying the execution of step 215 in such a manner as to have little or no perceptible impact on system performance from the user's point of view.

In step 225, the user program begins a process to save the altered operating file and an instruction to save the altered operating file is sent to the resident program. In step 230 the resident program saves the altered operating file pursuant to the instruction. In step 235, immediately after the altered operating file is saved by the resident program, file capture block 10 captures the altered operating file, preferably by creating and storing an archive file of the altered operating file in input buffer 20. In accordance with a preferred feature of the invention, file capture block 10 may save the archive file in such a way that previous revisions of the operating file are retained. That is, every time the operating file is changed, file capture block 10 saves an archive file and database 30 is updated with information about the archive file. Accordingly, over time, a plurality of archive files may be created from the original operating file. Each archive file represents a revision of the original operating file.

File Capture in the "RENAME" Operation

Figure 4:
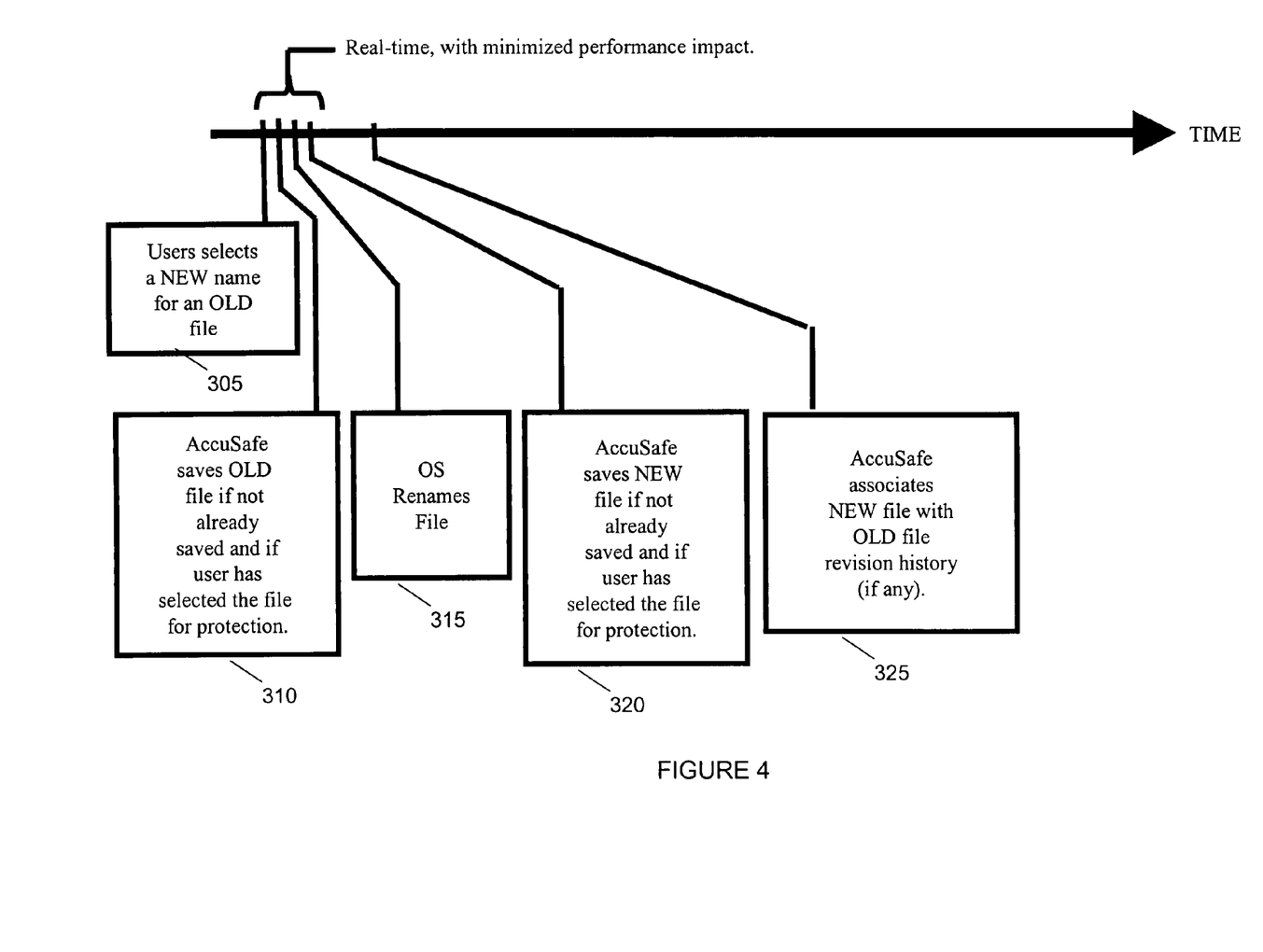
FIG. 4 is a time line illustrating a sequence of events in another exemplary operation in accordance with the invention.

As illustrated in FIG. 4, step 305, in performing an operating file rename operation, the user or a program generates an instruction for the resident program to select a new name for an old operating file. In step 310, file capture block 10 detects the instruction and captures the old operating file. Optionally, prior to capturing the old operating file, file capture block 10 may check database 30 to a) determine whether the operating file has previously been archived, b) determine whether the user has selected the operating file for protection, or c) determine a match to other defined conditions. If the go-ahead conditions exist, then file capture block 10 creates an archive file of the old operating file and stores the archive file in a storage location such as storage device 35 or, more preferably, input buffer 20 just before the resident program renames the old operating file. In step 315 the resident program renames the old operating file, thus creating a new operating file. Immediately after the old operating file is renamed, file capture block 10 captures the new operating file. Optionally, prior to capturing the new operating file, file capture block 10 may determine whether the new operating file has previously been archived, whether the user has selected the new operating file for protection, or other matching conditions exist. Like the archive file for the old operating file, the archive file for the new operating file is preferably stored in input buffer 20. In step 325 file capture block 10 and smart data management block 15 associate or link the new operating file with each of the versions of the old operating file to create a continuous operating file revision history.

File Capture in the "Delete" Operation

Figure 5:
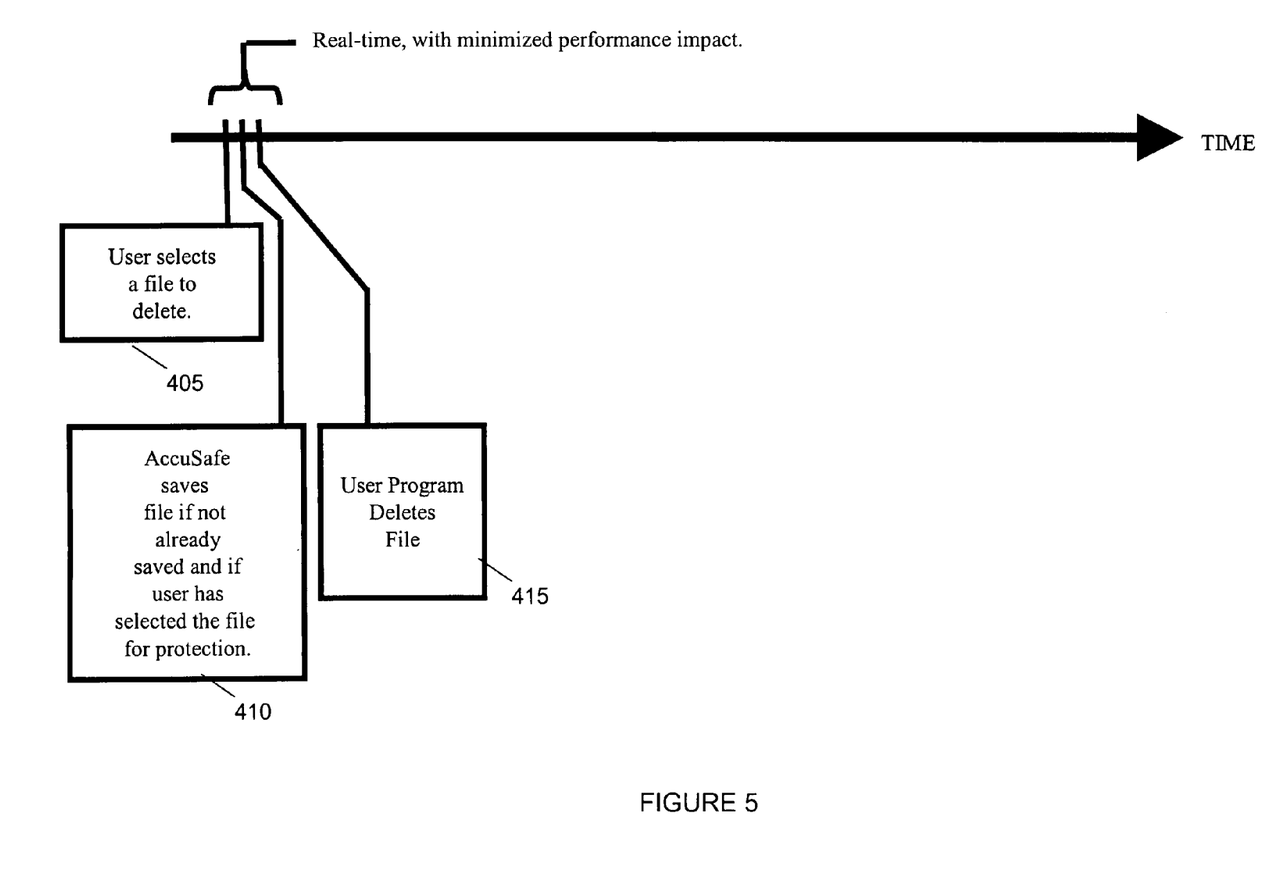
FIG. 5 is a time line illustrating a sequence of events in still another exemplary operation in accordance with the invention.

FIG. 5 illustrates the file capture process in the delete operation. In step 405, the user or a program identifies an operating file to delete and generates an instruction to the resident program. In step 410, file capture block 10 detects the instruction and captures the operating file just before it is deleted in step 415. Optionally, prior to capturing the operating file, file capture block 10 may check database 30 to a) determine whether the operating file has previously been archived, b) determine whether the user has selected the operating file for protection, or c) determine a match to other defined conditions. If the go-ahead conditions exist, then file capture block 10 preferably captures the operating file. In step 420, the resident program deletes the operating file.

As shown by the examples given, a clear advantage of the invention is, regardless of the operation being performed, after each file capture step, file capture block 10 preferably updates database 30 to indicate the location of the corresponding archive file. Database 30 may keep track of multiple versions of an operating file, any of which may be accessed at the request of the user or other program.

Another advantage of the invention is that by capturing the operating file just before and/or just after an operation is performed thereon, the invention achieves near real-time operating file archiving while achieving minimal missed alterations to an operating file.

A further advantage of the invention in its preferred embodiment, is that by intelligently managing the migration of operating files from the input buffer 20 through the output buffer 25 to the storage device 35, the invention achieves protection of operating files even when the desired storage device is permanently or temporarily unavailable.

INDUSTRIAL APPLICABILITY

The present invention is suited for any application that requires or benefits from near real time file capture, that seeks improved file integrity and/or that seeks efficient management of file storage. For example, the present invention is particularly useful in backup systems, audit trail systems, computer security systems, systems for monitoring computer users and others.

Although the present invention has been described in terms of particular preferred embodiments, it is not limited to those embodiments. Alternative embodiments, examples, and modifications which would still be encompassed by the invention may be made by those skilled in the art, particularly in light of the foregoing teachings.

We claim:

1. In a computing device, a method for archiving files comprising:
    detecting an instruction by an operating system to perform an operation on an operating file;
    creating an archive file from the operating file and storing the archive file in a temporary first storage location temporally proximate to the operation being performed on the operating file and responsive to detecting the instruction;
    searching the first temporary storage location for the archive file responsive to the occurrence of a first event; and
    moving the archive file to a second storage location responsive to a second event, the second storage location being a permanent storage location,
    after storing the archive file in the first temporary storage location, updating a database to indicate that the archive file is located in the first temporary storage location;
    determining a final destination for the archive file;
    moving the archive file from the first temporary storage location to an intermediate storage location;
    updating the database to indicate that the archive file is located in the intermediate storage location; and
    after moving the archive file to the second storage location, updating the database to indicate that the archive file is located in the second storage location.

2. The method of claim 1 wherein the second storage location includes a personal attached storage device.

3. The method of claim 1 wherein the second storage location includes a network attached storage device.

4. The method of claim 1 wherein the second storage location includes a peer-to-peer storage device.

5. The method of claim 1 wherein the second storage location includes an Internet storage area network.

6. An article of manufacture comprising a non-transitory computer usable medium having computer readable program code for performing the method of claim 1.

7. An article of manufacture comprising a processor configured to perform the method of claim 1.

8. In a computing device, a method for archiving files comprising:
- detecting an instruction by an operating system to perform an operation on an operating file;
- creating an archive file from the operating file and storing the archive file in a temporary first storage location temporally proximate to the operation being performed on the operating file and responsive to detecting the instruction;
- searching the first temporary storage location for the archive file responsive to the occurrence of a first event; and
- moving the archive file to a second storage location responsive to a second event, the second storage location being a permanent storage location,
- wherein the first event includes a message from a timer.

9. In a computing device, a method for archiving files comprising:
- detecting an instruction by an operating system to perform an operation on an operating file;
- creating an archive file from the operating file and storing the archive file in a temporary first storage location temporally proximate to the operation being performed on the operating file and responsive to detecting the instruction;
- searching the first temporary storage location for the archive file responsive to the occurrence of a first event; and
- moving the archive file to a second storage location responsive to a second event, the second storage location being a permanent storage location.
- wherein the second event includes a message from a timer.

10. In a computing device, a method for archiving files comprising:
- detecting an instruction by an operating system to perform an operation on an operating file;
- creating an archive file from the operating file and storing the archive file in a temporary first storage location temporally proximate to the operation being performed on the operating file and responsive to detecting the instruction;
- searching the first temporary storage location for the archive file responsive to the occurrence of a first event; and
- moving the archive file to a second storage location responsive to a second event, the second storage location being a permanent storage location,
- wherein the second event includes a message indicating when the second storage location is available.

11. In a computing device, a method for archiving files comprising:
- detecting an instruction by an operating system to perform an operation on an operating file;
- creating an archive file from the operating file and storing the archive file in a temporary first storage location temporally proximate to the operation being performed on the operating file and responsive to detecting the instruction;
- searching the first temporary storage location for the archive file responsive to the occurrence of a first event; and
- moving the archive file to a second storage location responsive to a second event, the second storage location being a permanent storage location,
- wherein said first event is different from said second event.

* * * * *